Patented July 12, 1932

1,867,022

UNITED STATES PATENT OFFICE

FERDINAND MÜNZ AND KARL KELLER, OF FRANKFORT-ON-THE-MAIN-FECHENHEIM, AND FRITZ GÜNTHER, OF LUDWIGSHAFEN-ON-THE-RHINE, GERMANY, ASSIGNORS, BY MESNE ASSIGNMENTS, TO I. G. FARBENINDUSTRIE AKTIENGESELLSCHAFT, OF FRANKFORT-ON-THE-MAIN, GERMANY, A CORPORATION OF GERMANY

WETTING, CLEANSING, AND EMULSIFYING AGENTS AND PROCESS OF MAKING SAME

No Drawing. Application filed December 11, 1928, Serial No. 325,383, and in Germany December 15, 1927.

The present invention relates to wetting, cleansing and emulsifying agents and more particularly to mixtures of an alkylated naphthalene sulfonic acid compound with up to approximately equivalent amounts of an organic quaternary ammonium compound having the general formula:

wherein X means OH or an acid residue, Z represents an alkyl or an aralkyl group and R represents phenyl or naphthyl.

We have found that it is possible to obtain these products by mixing an organic sulfuric acid compound of the aforesaid kind with an organic quaternary ammonium compound, which may be done either by neutralizing the organic sulfuric acid derivative with the quaternary ammonium base or more simply by mixing an alkali salt of a wetting agent of the above mentioned kind with a salt of the quaternary ammonium base.

These new ammonium salts surpass the alkali salts of the wetting agents as to their wetting capacity even in an alkaline bath. The solubility of our new ammonium salts is already sufficient for their technical use, but it may be much increased by an addition of a protective colloid, of soaps of Turkey red oils or in a very simple manner by using an excess of the wetting agent applied, for instance about 9 parts of the wetting agent to one part of ammonium base.

In order to further illustrate our invention the following examples are given, the parts being by weight and all temperatures in centigrade degrees, but it may be understood that our invention is not limited to the particular products or reacting conditions mentioned therein.

Example 1

100 parts of the sodium salt of a dibutyl-naphthalene-sulfonic acid are mixed with 20 parts of dimethyl-phenyl-benzyl-ammonium-chloride. The mixture thus obtained is a dry, nearly colorless powder soluble in water to form a barely opalescent solution. It possesses a substantially higher wetting power than the wetting agent applied alone, in a neutral medium as well as in an acidic or an alkaline one. The probable course of the reaction may be illustrated as follows:

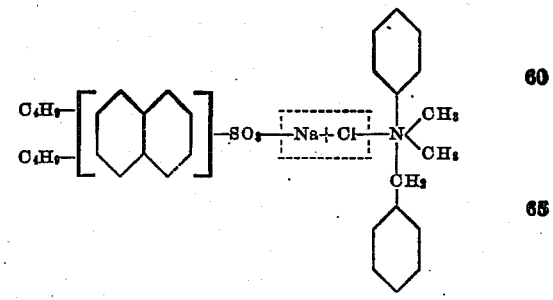

When using tetraethylammonium iodide as the quaternary ammonium salt, a product of similar properties is obtained.

Example 2

100 parts of free dibutyl-naphthalene sulfonic acid are introduced into a solution of 25 parts of the methyl-sulfuric acid salt of trimethyl-β-naphthyl-ammonium in about 250 parts of water. When the reaction is complete, the mass is allowed to settle. The bottom layer is a thick oil being the dibutyl-naphthalene sulfonic acid salt of trimethyl-β-naphthyl-ammonium. The oil may be used per se or mixed with a suitable Turkey red oil preparation in which case its solubility increases. The probable course of reaction may be illustrated as follows:

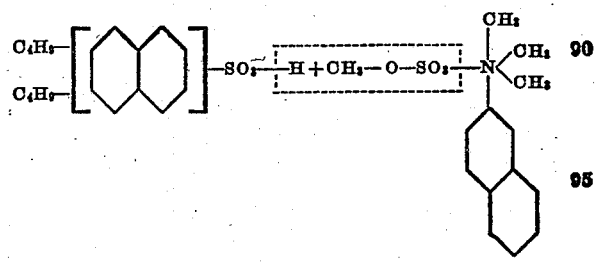

A similar product is obtained by starting from trimethyl - α - naphthyl - ammonium methylsulfate instead of the corresponding β-naphthyl compound mentioned above.

*Example 3*

95 parts of the sodium salt of di-isopropyl-naphthalene sulfonic acid and 5 parts of the para-toluene-sulfonate of trimethyl-β-naphthyl-ammonium are intimately mixed together. The wetting properties of an aqueous solution of this mixture are considerably better than those of a solution of the free di-isopropyl-naphthalene sulfonic acid or of its sodium salt, when similarly concentrated. The probable course of reaction may be illustrated as follows:

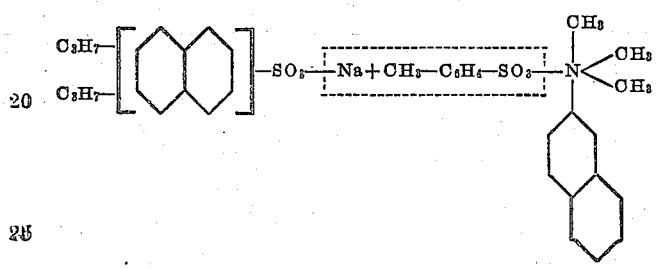

We claim:

1. A process which comprises mixing an alkylated naphthalene sulfonic acid compound and up to equivalent amounts of an organic quaternary ammonium compound of the general formula:

wherein X means OH or an acid residue, Z represents an alkyl or an aralkyl group and R represents phenyl or naphthyl.

2. A process which comprises mixing an alkylated naphthalene sulfonic acid salt and up to equivalent amounts of an organic quaternary ammonium salt of the general formula:

wherein X means an acid residue, Z represents an alkyl or an aralkyl group and R represents phenyl or naphthyl.

3. A process which comprises reacting with a salt of an alkylated naphthalene sulfonic acid on up to equivalent amounts of a salt of trimethyl-beta-naphthyl-ammonium base.

4. A process which comprises reacting with a salt of an alkylated naphthalene sulfonic acid up to equivalent amounts of a salt of dimethyl-phenyl-benzyl-ammonium base.

5. As new products wetting, cleansing and emulsifying mixtures of an alkylated naphthalene sulfonic acid compound with up to equivalent amounts of an organic quaternary ammonium compound of the general formula:

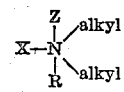

wherein X means OH or an acid residue, Z represents an alkyl or an aralkyl group and R represents phenyl or naphthyl.

6. As new products wetting, cleansing and emulsifying mixtures of an alkylated naphthalene sulfonic acid salt with up to equivalent amounts of an organic quaternary ammonium salt of the general formula:

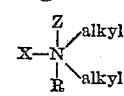

wherein X means an acid residue, Z represents an alkyl or an aralkyl group and R represents phenyl or naphthyl.

7. As new products wetting, cleansing and emulsifying mixtures of an alkylated naphthalene sulfonic acid salt with up to equivalent amounts of a trimethyl-beta-naphthyl-ammonium salt.

8. As new products wetting, cleansing and emulsifying mixtures of an alkylated naphthalene sulfonic acid salt with up to equivalent amounts of a dimethyl-phenyl-benzyl-ammonium salt.

In testimony whereof, we affix our signatures.

FERDINAND MÜNZ.
KARL KELLER.
FRITZ GÜNTHER.